Oct. 31, 1950 D. K. DU BOIS 2,528,269

SELECTOR SWITCH CONTROL FOR AUTOMATIC TELEPHONE SYSTEMS

Filed May 11, 1948 3 Sheets-Sheet 1

INVENTOR
D.K. DUBOIS
BY
Ha Sattison
ATTORNEY

SELECTOR SWITCH CONTROL FOR AUTOMATIC TELEPHONE SYSTEMS

Filed May 11, 1948 3 Sheets-Sheet 2

INVENTOR
D.K. DUBOIS
BY H. A. Patterson
ATTORNEY

Oct. 31, 1950 D. K. DU BOIS 2,528,269

SELECTOR SWITCH CONTROL FOR AUTOMATIC TELEPHONE SYSTEMS

Filed May 11, 1948 3 Sheets-Sheet 3

INVENTOR
D.K. DUBOIS

BY H. A. Patterson

ATTORNEY

Patented Oct. 31, 1950

2,528,269

UNITED STATES PATENT OFFICE 2,528,269

SELECTOR SWITCH CONTROL FOR AUTOMATIC TELEPHONE SYSTEMS

Daniel King Du Bois, Watervliet, N. Y., assignor to American Telephone and Telegraph Company, a corporation of New York Application May 11, 1948, Serial No. 26,276

13 Claims. (Cl. 179—18)

This invention relates to telephone exchange systems employing mechanical switching devices and more particularly to impulse registering and translating devices for such systems.

The number of offices which may be connected by a given exchange system is indicated by the number of digits in the office codes. Obviously a two-digit code would permit selection among not more than one hundred offices but in practice this number would be decreased by the reservation of the digit zero for calls through an operator's position and the absorption of a single impulse to avoid false operation due to accidents. A further decrease would be caused by the difficulty of finding office names having certain initial combinations of letters. Thus the maximum number of offices which may be reached is something less than eighty.

In exchange areas employing a two-digit code, connections are usually established through the intermediation of a sender which registers the impulse series dialed by the calling subscriber and then automatically controls the routing of the call and the connection of the calling subscriber's line to the called subscriber's line in accordance with the setting of the registers. An exchange system of this general type is disclosed in Patent 1,509,434 granted September 23, 1924 to Ottmar H. Kopp. In the system disclosed in this patent, a single translator switch assembly is disclosed which is capable of being set into any one of forty code positions in response to the setting of the A and B code digit registers by the two office code digits of a called line number dialed by a calling subscriber. For small exchange areas where the expected increase in subscriber lines will not require more offices than can be provided for by a single translator switch assembly having a maximum of forty office code positions, a sender of the type disclosed in the Kopp patent is adequate.

It has, however, been realized that the increase in subscriber lines in some exchange areas which may be served by senders arranged for two office code digit operation may require more than the forty code points available over the terminal arcs of a single translator switch assembly and accordingly the senders installed in such areas have been provided with two translator switch assemblies providing a maximum of eighty office code points. Patent 1,595,072 granted August 10, 1926 to H. C. Caverly illustrates schematically a sender of the type disclosed in the patent to Kopp hereinbefore referred to, modified by the addition of a second translator switch assembly. When it is known at the time of installation that both translator switch assemblies will be necessary at the time of cut-over for service, both assemblies and the necessary circuits for selectively operating them, as disclosed in the patent to Caverly, would be provided. However, in smaller exchange areas where there appears to be no immediate prospects that a second translator switch assembly will be necessary, but where there is a possibility that sometime in the future a second translator switch assembly may be needed, one translator switch assembly is initially installed and wired for operation and mounting space on the switch frame is reserved for the later installation of a second translator switch assembly.

In some exchange areas in which a single translator switch assembly has been installed in each sender, it has been found that the growth of the exchange areas has been such as to indicate the necessity of installing more offices in each such area that may be served by senders of the single translator switch assembly type. Such senders could of course be equipped with additional translator assemblies if space has been reserved for them on the switch frames but such installation would entail considerable expense. In offices where no provision has been made for the mounting of additional translator assemblies the expense would be even greater because additional frames and cabling would be required. In systems employing senders of the type disclosed in the patents hereinbefore referred to, the costly addition of second translator assemblies would be indicated even though a small number of additional code points would ever be required and far fewer than the forty additional code points which the added translator assembly would afford.

It is the object of the present invention to enable a single translator switch assembly to increase the number of code points beyond its terminal bank capacity so that a single assembly may serve to control the establishment of connections to an increased number of offices.

This object is attained in accordance with the present invention by the provision of a grouping circuit comprising six relays to permit the grouping of two sets of codes in each half of the translator, each set requiring one translator point in each half and by a splitting circuit comprising a set of five relays to break down the hitherto rigid association of mated codes to permit each of them to be treated independently of the other.

Since complete telephone exchange systems of the type to which the sender of the present invention is applicable have been disclosed in a number of patents in the prior art, only so much of an exchange system as is essential to an understanding of the invention has been disclosed herein. Reference is made to the patents hereinbefore referred to for a more complete disclosure of such circuits.

Referring to the drawings.

Figure 1:
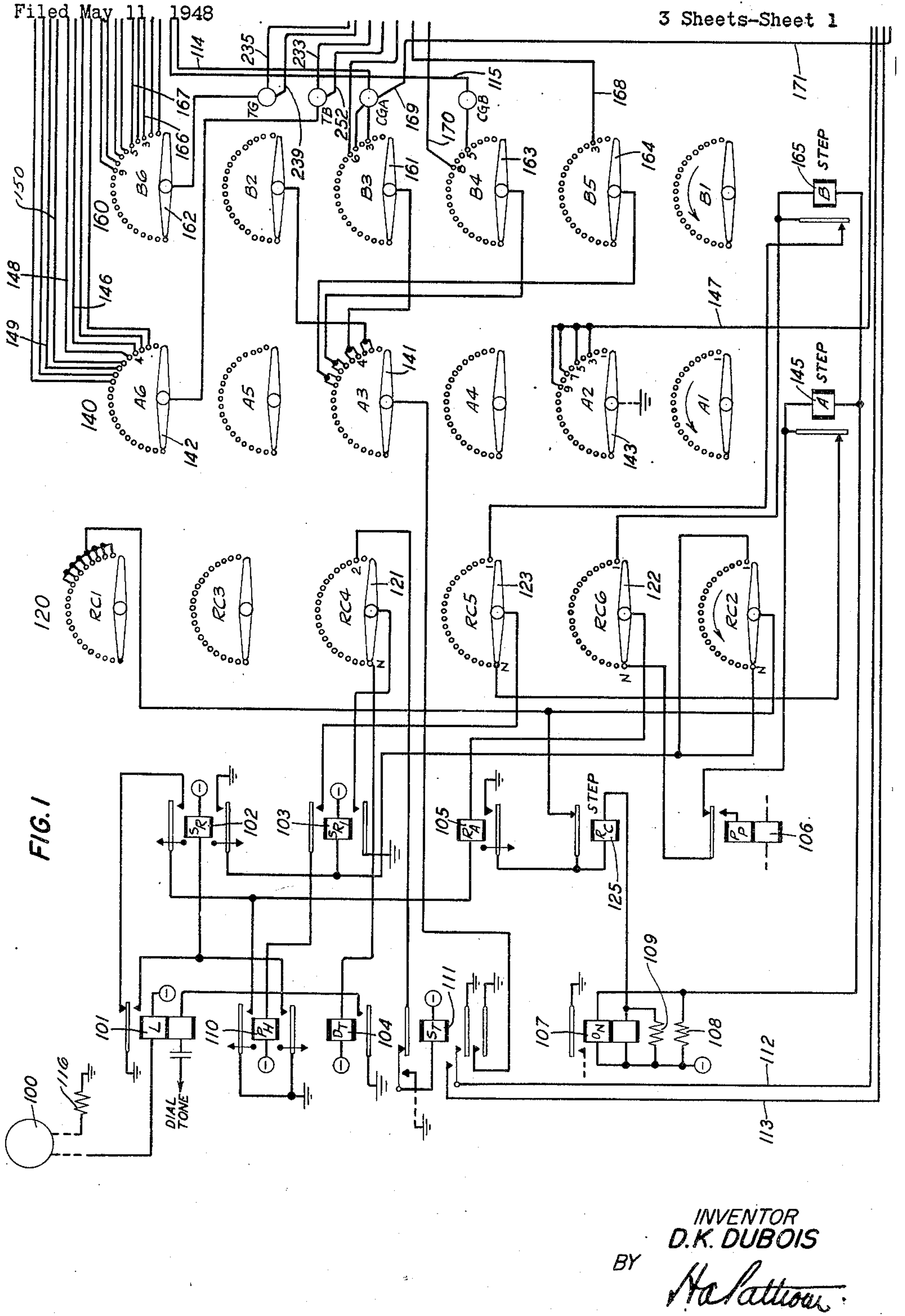
Figure 1 shows a calling subscribers' substation, control relays of a sender associable with such line, a register control switch and the A and B code digit registers.

Each sender is provided with a plurality of step-by-step registering devices. These devices may be of any desired character but are preferably of the type shown and described in Patent 1,472,465 granted October 20, 1923 to O. F. Forsberg and R. M. DeVignier. Two of such registers namely the A code digit register 140 and the B code digit register 160 are disclosed in Fig. 1. A register control or steering switch 120 of the same type is utilized to direct the successive series of dialed impulses to the registering devices.

Figure 2:
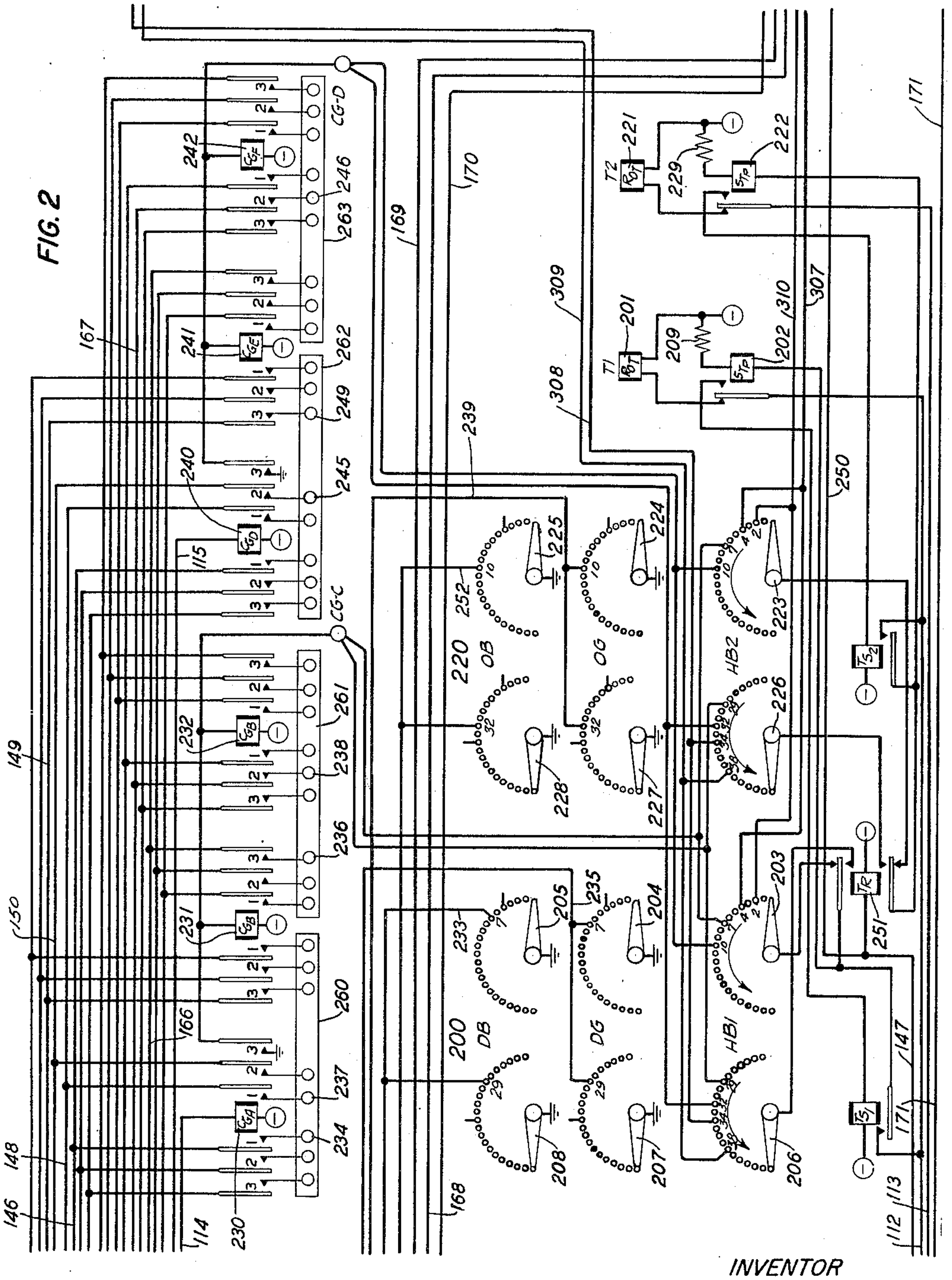
Fig. 2 shows the two translator switches comprising a single translator assembly and the two sets of grouping relays.
Figure 3:
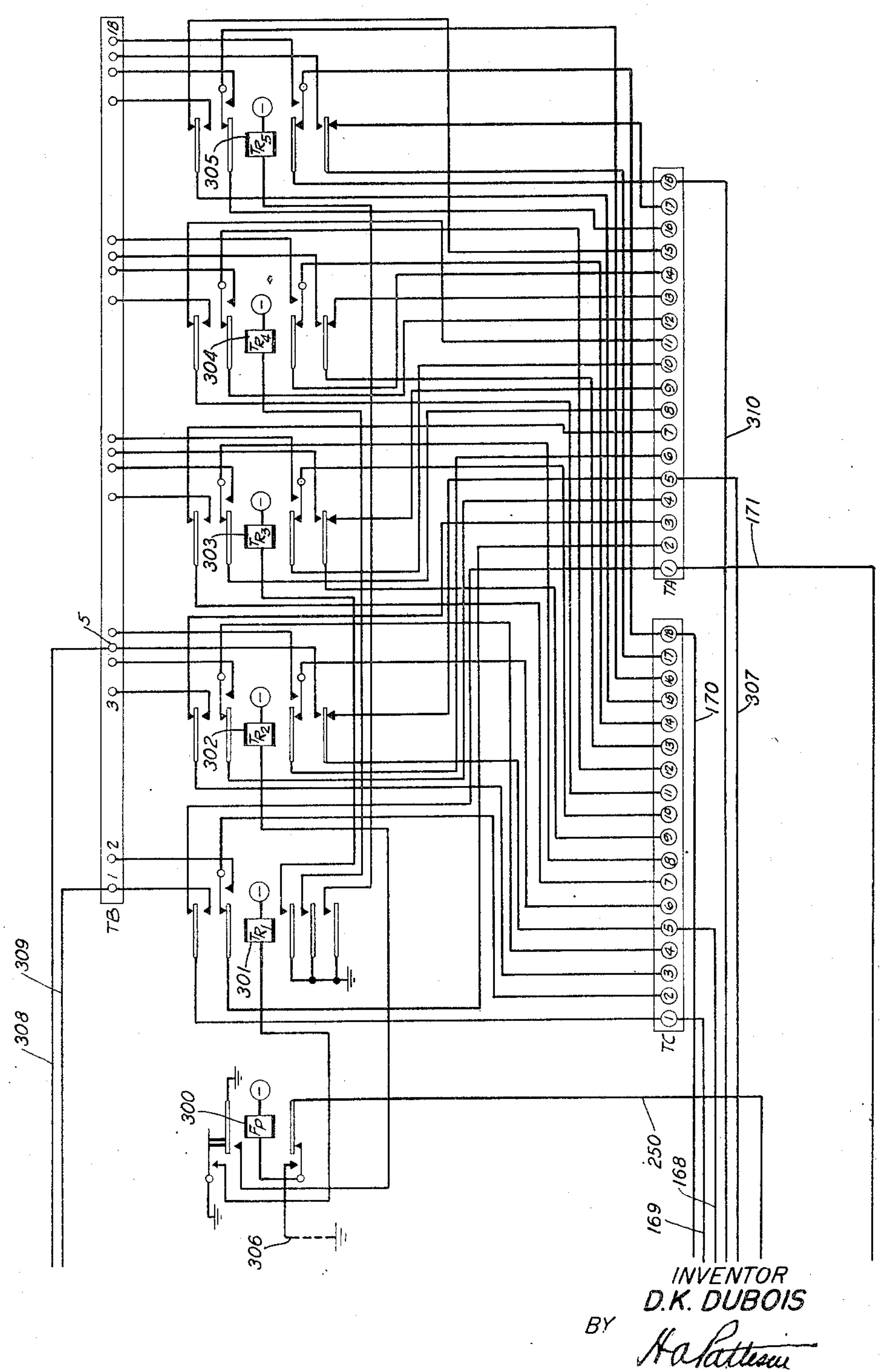
Fig. 3 shows the relays of the splitting circuit. For a full disclosure of the invention, Fig. 2 should be placed to the right of Fig. 1 and Fig. 3 should be placed to the right of Fig. 2.

The translator assembly disclosed in Fig. 2 is of such simple construction that it has not been considered necessary to disclose its mechanism herein. Two arcuate contact banks, each comprising a plurality of contact sets and each contact set comprising a plurality of contacts, are arranged side by side and supported by a suitable frame. A brush shaft carrying two brush sets arranged to cooperate with the contact sets is mounted in operative relation to the contact banks in the same frame. The brush sets are 180 degrees apart in displacement, that is, they are diametrically opposite one another on the shaft and the arrangement is such that when one brush set completes its travel over its associated contact bank the other brush set will begin its travel over its associated bank. The power is transmitted to the shaft from a constantly rotating shaft by means of clutch discs controlled in the manner commonly employed for driving sequence switches. The power source is indicated in the present disclosure by the clutch magnets 201 and 221. Since the brush sets are driven at high speed, stop magnets represented in the drawing by magnets 202 and 222 have been provided for each half of the translator assembly in order to insure the stopping of the brush sets on the desired terminal set.

As the number of functions to be controlled by the translator assembly exceeds the number of arcs usually provided on a switch of this type, two switches 200 and 220 are provided and are rotated and stopped simultaneously so that they form essentially one translator switch.

The detailed operation of the system is as follows:

When a calling subscriber for example at substation 100, removes his receiver from the switchhook, the operation of hunting switches is initiated in the usual manner whereby the calling line becomes connected with an idle sender, for example, the sender, portions of which are disclosed in the drawing. When the idle sender is selected, a circuit is completed from ground through the balancing coil 116, over one conductor of the subscriber's line, through the substation thereof and then over the other conductor of the subscriber's line and through the upper winding of the L relay 101 and through the central office battery to ground. Relay 101 energizes and closes over its front contact an obvious circuit for the slow-to-release SR relay 102 which operates and over its lower contacts establishes an obvious circuit for the SR1 relay 103 which also operates. Relay 103 upon operating, establishes a circuit from ground over its lower contacts, the normal bank contact and brush 121 of arc RC4 of the register control switch 120 and through the winding of the DT relay 104 to the central office battery. Relay 104 thereupon operates and establishes a circuit from ground over its contacts, through the lower winding of line relay 101 to the dial tone source. A tone current is induced from the dial tone source into the upper winding of relay 101 whereby the calling subscriber is notified by the dial tone which he hears in his receiver that he may dial the digits of the desired called line number. Relay 102 also prepares the impulse circuit for setting the A code digit register 140, which may be traced from the back contact of relay 101, over the upper contacts of relay 102, through the winding of the slow-to-release RA relay 105, over brush 122 and normal bank contact of arc RC6 of the register control switch 120, over the back contact of the PP relay 106, through the winding of stepping magnet 145 of the A code digit register 140 and through the upper winding of the ON relay 107 in parallel with resistor 108 to the central office battery.

When the subscriber dials the first digit of the office code of the wanted line number, the circuit of relay 101 is opened a number of times corresponding to the numerical value of the code letter. At each interruption of its circuit, relay 101 deenergizes and its armature falls back opening the circuit of relay 102 which, however, being slow-to-release, remains energized during these short interruptions of its circuit. The deenergization of relay 101 connects ground over its back contact to the impulse circuit previously traced causing relays 105 and 107 and the stepping magnet 145 to operate in series. Magnet 145 releases at the end of each impulse when relay 101 reenergizes to advance the brushes of register 140 one step. Relay 105 being slow-to-release remains energized until the completion of the series of impulses when it also deenergizes. The operation of relay 105 closes a circuit from the central office battery through the lower winding of ON relay 107 in parallel with resistor 109, through the winding of stepping magnet 125 of the register control switch 120 and to ground over the contacts of relay 105. Magnet 125 is thus energized and remains energized until the deenergization of relay 105 at the end of the series of impulses when it releases to advance the brushes of switch 120 into engagement with the No. 1 contacts, of their associated arcs. It will be noted that each deenergization of relay 101 also closes a circuit from the central office battery through the winding of pulse help (PH) relay 110, over the upper contacts of relay 103, the brush 123 and normal contact of arc RC5 of the register control switch 120, over the back contact of stepping magnet 145 of the A code digit register 140, over the back contact of relay 106, the normal contact of switch arc RC6 and brush 122, through the winding of relay 105, the upper contacts of relay 102 and to ground over the back contact of relay 101. Relay 110 energizes and over its lower contacts connects ground to the winding of relay 102 to insure that such relay remains energized during the interruptions of its circuit and over its upper contacts connects ground to the previously traced circuit through the winding of stepping magnet 145 until this magnet completely attracts its armature thus insuring the operation of magnet 145 and the advance of the brushes of register 140 one step.

With the brushes of register control switch 120 now in engagement with the No. 1 contacts of their respective arcs, the impulsing circuit extends from the back contact of relay 101, over the upper contacts of relay 102, through the winding of relay 105, brush 122 and the No. 1 contact of switch arc RC6, winding of stepping magnet 165 of the B code digit register 160 and through the upper winding of relay 107 and resistor 108 in parallel to the central office battery. Each interruption of the line circuit due to the dialing of the second digit of the office code of the wanted line number, releases relay 101 to thereby close the impulse circuit through the winding magnet 165 and each opening of the impulsing circuit due to the reoperation of relay 101 causes the release of magnet 165 and the advance of the brushes of the code register 160 one step. As in the case of register 140, relay 105 remains energized throughout the series of impulses and holds stepping magnet 125 of the register control switch energized. At the completion of the series of impulses, magnet 125 releases and advances the brushes of the register control switch 120 one step into engagement with the No. 2 contacts of their respective arcs in which the impulse circuit is extended to the stepping magnet of the thousands digit register (not shown). The setting of the numerical registers takes place in a manner similar to that of the code registers and is shown and described in the above-identified Patent 1,509,434. The circuit above-traced for relay 110 is completed in the second position of switch 120, over brushes 122 and 123 of switch 120 in engagement with the No. 1 contacts of their respective arcs and over the back contact of stepping magnet 165 to insure the proper advance of register 160 in response to each impulse.

In a sender employing a translator assembly of the type disclosed in Patent 1,509,434, hereinbefore referred to, the A6 and B6 arcs of the A and B code digit registers are reserved for use in connection with calls routed to manual offices and on which calls the sender transmits codes of impulses to set a call indicator at the manual office to display on lamps the number of the wanted line. Since in many instances all manual offices of an exchange area become ultimately converted by the installation of machine switching equipment for full mechanical operation, the A6 and B6 arcs of the code digit registers are no longer required for call indicator operation. In such cases, these switch arcs become available for other uses. These code register arcs have, in accordance with the present invention, been employed together with two sets of code group relays 230, 231, 232 and 240, 241, 242 for enabling an increase in office code translations with the initially installed translator equipment.

The function of the code grouping relays is to permit the grouping of two sets of codes on each half of the translator assembly, each set requiring one translator point in each half. In the system to which the invention is applicable, each registration of the A and B code digits is translated into a plurality of selection controls which may include the control of the brush and group selection movements of the district selector, generally known as district brush and district group selections, and the control of the brush and group selection movements of the office selector, generally known as office brush and office group selections.

For connection to some terminating offices, the district brush and group selections may be the same for more than one office connection, the selective discrimination being made through different office brush and group selections. Also for connection to other connecting offices, the district brush and group selections may be different whereby different office selectors are selected on calls to several offices but the office brush and office group selections made at the selected office selectors may be the same for the several different office connections.

The condition under which a set of codes may be grouped therefore, is that all selections be identical except (*a*) district brush and district group selections for routes not requiring office selections (*b*) office brush and office group selections for routes requiring office selections. In accordance with the present invention, provision is made for two code groups in each half of the translator. As disclosed in Fig. 2, the set of code group relays 230, 231 and 232 has been allocated to two such groups, one in each half of the translator assembly, requiring the same office brush and office group selection controls for which one translation point is reserved in each half of the translator assembly and the other set of code group relays 240, 241 and 242 has been allocated to two other code groups one in each half of the translator assembly requiring the same district brush and district group selection controls for which one translator point is reserved in each half of the translator assembly. For this purpose, the contacts of relays 230, 231 and 232 are cross-connected from the terminal strips 260 and 261 to counting relays of the sender to control district brush and district group selections and the contacts of relays 240, 241 and 242 are cross-connected from the terminal strips 262 and 263 to the counting relays to control office brush and office group selections.

It is to be understood however, that both sets of relays could be allocated either to provide four code groups, two in each half of the translator assembly, for codes involving like district brush and group selection controls or to provide four code groups, two in each half of the translator assembly, for codes involving like office brush and group selection controls. If the code group relays are allocated in the first manner, then the terminals of terminal strips 260 and 262 would be cross-connected to the counting relays for office brush selection control and the terminals of strips 261 and 263 would be cross-connected to the counting relays for office group selection control. If the code group relays are allocated in the second manner, then the terminals of terminal strips 260 and 262 would be cross-connected to the counting relays for district brush selection control and the terminals of strips 261 and 262 would be cross-connected to the counting relays for district group selection control.

The actual setting of the A and B code digit registers and the translator equipment for representative two-digit codes employing the code grouping feature of the invention will now be discussed.

It will be assumed that the wanted subscriber's line terminates in an office listed as Genoa. The code dialed in this case is G—E which will result in the sending of two series of impulses comprising four impulses and three impulses respectively. In this case the A code digit register 140 comes to rest with its brushes engaged with the No. 4 contacts of their respective arcs and the B code digit register 160 comes to rest with its brushes engaged with the No. 3 contacts of their respective arcs. As soon as the register control switch 120 advances following the setting of the B code digit register 160, the circuit of start relay 111 is established from ground over the lower contacts of relay 103, brush 121 engaged with the No. 2 contact of its arc RC4, over the upper transfer contacts and through the winding of relay 111 and to the central office battery. Relay 111 thereupon energizes and locks over its upper alternate contacts and connects ground over its lower contacts to brush 141 of the A code digit 140. A circuit is thereby completed over the No. 4 contact of arc A3 of the A code digit register, brush 161 of the B code digit register, the No. 3 contact of arc B3 upon which brush 161 is standing, over the cross-connection to cross-connection terminal CGA, it being assumed that the code 43 is one of a code group, thence through the winding of the CGA code group relay 230 to the central office battery.

Relay 230 is thereby energized and over its No. 3 right contacts establishes obvious circuits for the CGB and CGC code group relays 231 and 232. The operation of the set of code group relays 230, 231 and 232 is, in the case assumed, indicative of the fact that the code 43 dialed is one of a code group for which the office brush and office group selections will be the same. Relay 230 also connects ground over its right No. 3 contacts to cross-connection terminal CGC which it will be assumed is connected for the code group under consideration to the No. 7 contacts of the hunting arcs HB1 and HB2 of the right halves of the translator switches 200 and 220 to determine that the translator switches will be controlled to stop on the translation point 7.

Similarly, other contacts of the arcs B2, B3, B4 and B5 of the B code digit register 160, could be cross-connected to cross-connection terminal CGA to cause the operation of the set of code group relays 230, 231 and 232 and thereby the connection of ground to the No. 7 contacts of the hunting arcs of the right halves of the translator switches, should it be possible to include other office codes in the same code group as code 43 above discussed.

As an example of this, the dialing of the code letters I—L for a call to the Illinois office of the exchange area, resulting in the setting of the A code digit register 140 into the position in which its brushes engage the No. 4 contacts of their respective arcs and in the setting of the B code digit register 160 into the position in which its brushes engage the No. 5 contacts of their respective arcs, would result in the connection of ground to cross-connection terminal CGA and the operation of relays 230, 231 and 232 as previously described. Thus, the office code 45 would be allocated to the same code group as code 43.

When the register control switch 120 advances, following the setting of the B code digit register 160, and relay 111 is operated, circuits are completed from ground over the inner lower contacts of relay 111, conductors 112 and 113 and over the back contacts of stop magnets 202 and 222 of the translator switches 200 and 220 and through the windings of clutch magnets 201 and 221 of such switches to the central office battery. These clutch magnets thereupon energize to clutch the brush shafts of the translator switches to the constantly operating drive shaft of the exchange whereby the brush sets of the translator switches are advanced over their respective contact banks. When the hunting brush 203 engages the No. 7 contact of its arc, a circuit is established from ground applied to such contact as previously described to determine one of the code groups, over brush 203, the upper back contact of the TR relay 251, through the winding of stop magnet 202 of switch 200 and resistor 209 to the central office battery and magnet 202 energizes to open the circuit of clutch magnet 201 to stop switch 200. Similarly, when brush 223 of switch 220 engages the No. 7 contact of its arc, a circuit is established from ground applied thereto by code group relay 230, over brush 223, the lower back contact of relay 251, through the winding of stop magnet 222 of switch 220 and resistor 229 to the central office battery and magnet 222 energizes to open the circuit of clutch magnet 221 to thereby stop switch 220.

With the brush 205 of the translator switch 200 arrested in engagement with the No. 7 contact of its arc, a first circuit is established from ground over brush 205 and conductor 233 to cross-connection terminal TB, brush 142 of the A code digit register, thence, assuming that this brush is in engagement with the No. 4 contact of its arc for the code 43 as previously described, over conductor 146 and the No. 1 left contacts of relay 230 to terminal 234 on the strip 260 which terminal is connected to the proper counting relay for controlling the district brush selection. A second circuit is established from ground over brush 204 and the No. 7 contact of its arc and conductor 235 to cross-connection terminal TG, brush 162 of the B code digit register, thence, assuming that this brush is in engagement with the No. 3 contact of its arc for the code 43, over conductor 166 and the No. 3 right contacts of relay 231 to terminal 236 on the strip 261 which terminal is connected to the proper counting relay for controlling the district group selection. If translator contact No. 7 has the district selections controlled by the settings of the A and B code digit registers as just described, then the office brush and group selections are controlled over translator contacts No. 7 in the usual manner (usually skip-office). Over other arcs (not shown) of the switches 200 and 220 other selection controls are made in the usual manner.

On other office calls, allocated to the same code group served by the code point 7 in the right halves of the translator switches, the office brush and office group selections controlled from the arcs associated with translator brushes 225 and 224 will be made in the usual manner but the district brush and district group selection controls under the control of the code group relays 230, 231 and 232 will differ in accordance with the position of the A office code register brush 142 and the position of the B office code register brush 162. Thus for a call having the office code 45 previously considered with brush 142 set on the No. 4 contact of its arc, the circuit previously traced over conductor 146 and the No. 1 left contacts of relay 230 to terminal 234 is completed to control district brush selection and a circuit is established from ground applied over translator brush 204 and the No. 7 contact of its associated arc to cross-connection terminal TG is extended over brush 162 and the No. 5 contact of its arc, conductor 167 and the No. 2 left contacts of relay 232 to terminal 236 on terminal strip 261 for controlling district group selection.

As a further example, it will be assumed that the subscriber dials the number of a line which terminates in the Kenvil office of the exchange area. The code dialed in this case is K—E and will result in the sending of two series of impulses comprising five impulses and three impulses respectively. With brush 143 of the A code digit register 140, positioned upon the No. 5 contacts of its arc A2, a circuit is established from ground over brush 143 and such contact, conductor 147, through the winding of relay 251 to central office battery, and from conductor 147 to conductor 250, the winding of the FP relay 300 and thence to the central office battery. Relays 251 and 300 thereupon operate over this circuit, relay 300 upon operating locking to off-normal ground over its lower alternate contacts and conductor 306. The operation of transfer relay 251 is indicative that a code point in the left halves of the translator switches is to be used.

In response to the dialing of the code K—E having a numerical equivalent of 53, the A code digit register 140 comes to rest with its brushes engaged with the No. 5 contacts of their respective arcs and the B code digit register 160 comes to rest with its brushes engaged with the No. 3 contacts of their respective arcs. When ground is thereafter connected to brush 141 of register 140 as previously described, a circuit is established over brush 141 and the No. 5 contact of switch arc A3, over brush 161 and the No. 3 contact of switch arc B3 cross-connection terminal CGA, conductor 114 and thence through the winding of code group relay 230 to the central office battery. Relay 230 will therefore energize in turn causing the energization of relays 231 and 232 and the connection of ground to one of the hunt contacts in the left halves of the translator switches 200 and 220, assumed to be contact No. 29, to determine that the translator switches will be controlled to stop on translation point 29.

Similarly, other contacts of the arcs B2, B3, B4 and B5 of the B code digit register 160 could be cross-connected to cross-connection terminal CGA to cause the operation of the set of code group relays 230, 231 and 232 and thereby the connection of ground to the No. 29 contacts of the hunting arcs of the left halves of the translator switches should it be possible to include other office codes in the same code group as code 53 above discussed.

When the register control switch 120 advanced following the setting of the B code digit register 160 and relay 111 operated, the previously traced circuits for the clutch magnets 201 and 221 of the switches 200 and 220 are established and the brushes of such switches are advanced until the hunting brushes 206 and 226 engage the No. 29 contacts of their respective arcs, previously grounded through the operation of code group relay 230.

When brush 206 engaged the No. 29 contact of its arc, a circuit is established over the upper front contact of relay 251, through the winding of stop magnet 202 of switch 200 and resistor 209 to the central office battery and when the brush 226 engages the No. 29 contact of its arc, a circuit is established over the lower front contact of relay 251, through the winding of stop magnet 222 of switch 220 and resistor 229 to the central office battery. Magnets 202 and 222 thereupon operate to open the circuits of clutch magnets 201 and 221 to thereby arrest the advance of the brushes of switches 200 and 220.

With the brush 208 of translator switch 200 arrested in engagement with the No. 29 contact of its arc, a first circuit is established from ground over such brush and contact, conductor 233, cross-connection terminal TB, thence over brush 142 of the A code digit register and the No. 5 contact of arc A6 of such register, conductor 148 and the No. 1 right contacts of relay 230 to terminal 237 on terminal strip 260 which terminal is connected to the proper counting relay for controlling the district brush selection. A second circuit is established from ground over brush 207 and the No. 29 contact of its arc, conductor 235, cross-connection terminal TG, thence over brush 162 of the B code digit register and the No. 3 contact of arc B6, conductor 166 and the No. 3 right contacts of relay 231 to terminal 236 on terminal strip 261 which terminal is connected to the proper counting relay for controlling the district group selection. If translator contact No. 29 has the district selections controlled by the settings of the A and B code digit registers as just described, then the office brush and group selections are controlled over translator contacts No. 29 in the usual manner. Over other arcs (not shown) of the switches 200 and 220, other selection controls are made in the usual manner.

On other office calls allocated to the same code group served by code point 29 in the left halves of the translator switches, the office brush and office group selection controls from the arcs associated with translator brushes 225 and 224 will be made as usual but the district brush and district group selection controls under the control of code group relays 230, 231 and 232 will differ in accordance with the setting of brush 142 of the A code digit register and with the setting of brush 162 of the B code digit register. Code point 29 could be used on connections having codes requiring the same district selections and the office selections controlled by the settings of the A and B code digit registers.

It will now be assumed that two additional code groups are to be formed in which groups the district brush and group selections are the same but the office brush and group selections are different. For this purpose the winding of code group relay 240 is connected by conductor 115 to cross-connection terminal CGB. It will now be assumed that a calling subscriber dials the number of a wanted line which terminates in the Olean office of the exchange. The code dialed in this case is O—L which will result in the sending of two series of impulses comprising six impulses and five impulses respectively. In this case the A code digit register 140 comes to rest with its brushes engaged with the No. 6 contacts of their respective arcs and the B code digit register 160 comes to rest with its brushes in engagement with the No. 5 contacts of their respective arcs. When ground is thereafter connected to brush 141 of register 140 as previously described, a circuit is established over brush 141 and the No. 6 contact of register arc A3, over brush 163 and the No. 5 contact of register arc B4, cross-connection terminals CGB, conductor 115 and thence through the winding of the CGD code group relay 240 to the central office battery, whereupon relay 240 is energized and over its No. 3 right contacts establishes obvious circuits for the CGE and CGF code group relays 241 and 242. The operation of the set of code group relays 240, 241 and 242 is indicative of the fact that the code 65 dialed is one of a code group for which district brush and district group selections will be the same. Relay 240 also connects ground over its No. 3 right contacts to cross-connection terminals CGD which it will be assumed is connected to the No. 10 contacts of the hunting arcs HB1 and HB2 of the right halves of the translator switches 200 and 220 to determine that the translator switches will be controlled to stop on the translation point 10.

Similarly, other contacts of the arcs B2, B3, B4 and B5 of the B code digit register 160 could be cross-connected to terminal CGB to cause the operation of the set of code group relays 240, 241 and 242 and thereby the connection of ground to the No. 10 contacts of the hunting arcs of the right halves of the translator switches should it be possible to include other office codes in the same code group as code 65 above discussed.

When the register control switch 120 has advanced after the setting of the B code digit register 160 to cause the operation of start relay 111, the previously traced circuits for the clutch magnets 201 and 221 of switches 200 and 220 are established and, with transfer relay 251 unoperated since the A code digit is even, the brushes of each translator switch are advanced until the hunting brushes 203 and 223 engage the No. 10 contacts of their respective arcs grounded through the operation of code group relay 240.

When brush 203 engages the No. 10 contact of its arc, a circuit is completed over the upper back contact of transfer relay 251, through the winding of stop magnet 202 of switch 200 and resistor 209 to the central office battery and when brush 223 engages the No. 10 contact of its arc a circuit is established over the lower back contact of relay 251, through the winding of stop magnet 222 of switch 220 and resistor 229 to the central office battery. Magnets 202 and 222 thereupon operate to open the circuits of the clutch magnets 201 and 221 to thereby arrest the advance of the brushes of switches 200 and 220.

With the brush 225 of translator switch 200 in engagement with the No. 10 contact of its arc, a circuit is established from ground over brush 225, conductor 252, cross-connection terminal TB, thence over brush 142 of the A code digit register and the No. 6 contact of the arc A6, conductor 150 and over the No. 2 right contacts of code group relay 240 to terminal 245 of terminal strip 262 which terminal is connected to the proper counting relay to control the office brush selection. A second circuit is established from ground over brush 224 and the No. 10 contact of its arc, conductor 239, cross-section terminal TG, thence over brush 162 of the B code digit register and the No. 5 contact of its arc B6, conductor 167 and the No. 2 left contacts of code group relay 242 to terminal 246 of terminal strip 263 which terminal is connected with the proper counting relay to control the office group selection. If translator contact No. 10 has the office selections controlled by the settings of the A and B code digit registers, as just described, then the district brush and group selections are controlled over translator contacts No. 10 in the usual manner. Over other arcs (not shown) of translator switches 200 and 220, other controls are exercised in the usual manner.

On other calls allocated to the same code group served by code point 10 in the right halves of the translator switches, the district brush and district group selection controls from the arcs associated with the brushes 205 and 206 will be made in the usual manner but the office brush and office group selection controls under the control of the code group relays 240, 241 and 242 will differ in accordance with the position of the A office code digit register brush 142 and the position of the B office code digit register brush 162.

As a still further example, it will be assumed that the subscriber dials the number of a wanted line which terminates in the Porter office of the exchange area. The code dialed in this case is P—O which will result in the sending of two series of impulses comprising seven impulses and five impulses respectively. On this call the A code digit register 140 comes to rest with its brushes engaged with the No. 7 contacts of their respective arcs and the B code digit register 160 comes to rest with its brushes engaged with the No. 5 contacts of their respective arcs. When ground is thereafter connected to brush 141 of register 140, as previously described, a circuit is established over brush 141 and the No. 7 contact of arc A3, over brush 161 and the No. 5 contact of arc B3, cross-connection terminal CGB, conductor 115 and thence through the winding of code group relay 240 to the central office battery. Relay 240 will therefore energize in turn causing the energization of relays 241 and 242 and the connection of ground to the cross-connection terminal CGD. It will be assumed that for this code group the No. 32 translator code point is assigned and that therefore terminal CGD is connected to the No. 32 contacts of the left halves of the hunting arcs of translator switches 200 and 220.

Similarly, other contacts of the arcs B2, B3, B4 and B5 of the B code digit register 160 could be cross-connected to cross-connection terminal CGB to cause the operation of the set of code group relays 240, 241 and 242 and thereby the connection of ground to the No. 32 contacts of hunting arcs of the left halves of the translator switches, should it be possible to include other office codes in the same code group as code 75 above discussed.

As an example of this, the dialing of the S—U code for a call to the Sumner office of the exchange area, resulting in the setting of the A code digit register 140 into the position in which its brushes engage the No. 7 contacts of their respective arcs and in the setting of the B code digit register 160 into the position in which its brushes engage the No. 8 contacts of their respective arcs will result in the connection of ground to cross-connection terminal CGB and the operation of relays 240, 241 and 242 as previously described. Thus the code 78 would be allocated to the same code group as code 75.

With brush 143 of the A code digit register 140, positioned upon the No. 7 contact of its arc A2, the circuit of transfer relay 251 is established in the manner previously described. When the register control switch 120 has advanced after the setting of the B code digit register 160 to cause the operation of start relay 111, the previously traced circuits for the clutch magnets 201 and 221 of switches 200 and 220 are established and the brushes of such switches are advanced until the hunting brushes 206 and 226 engage the No. 32 contacts of their arcs previously grounded through the operation of code group relay 240.

When brushes 206 and 226 engage the No. 32 contacts of their arcs, the previously traced circuits for the stop magnets 202 and 222 of the translator switches 200 and 220 are established over the front contacts of transfer relay 251 and such magnets thereupon operate to arrest the advance of the brush sets of the switches.

With the brush 228 of translator switch 220 arrested in engagement with the No. 32 terminal of its arc, a circuit is established from ground over such brush and contact, conductor 252, cross-connection terminal TB, brush 142 and the No. 7 contact of arc A6 of the A code digit register, conductor 149 of the No. 3 left contacts of code group relay 241 to terminal 249 of terminal strip 262 which terminal is connected to the proper counting relay to control the office brush selection. A second circuit is established from ground over brush 227 and the No. 32 contact of its arc, conductor 239, cross-connection terminal TG, brush 162 and the No. 5 contact of arc B6 of the B code digit register 160, conductor 167, the No. 2 left contacts of code group relay 242 to terminal 246 on terminal strip 263 which terminal is connected to the proper counting relay to control the office group selection. If translator contact No. 32 has the office selections controlled by the settings of the A and B code digit registers, as just described, then the district brush and group selections are controlled over translator contacts No. 32 in the usual manner.

On other office calls allocated to the same code group served by code point 32 in the left halves of the translator switches, the district brush and district group selection controls from the arcs associated with the brushes 208 and 207 will be as just described but the office brush and office group selection controls under the control of the code group relays 240, 241, and 242 will differ in accordance with the position of the brush 142 of the A office code digit register and the position of the brush 162 of the B office code digit register.

It will be noted that the code points of arc A3 of the A code digit register are paired and that the four pairs of code points are connected to the brushes associated with the B2, B3, B4 and B5 arcs of the B code digit register. Thus for example, the office codes having the numerical digit equivalents 53 and 43, 55 and 45, 75 and 65, 78 and 68, and 93 and 83 constitute pairs. As may sometimes occur, one of the codes of the pair may be in use and the other unused, but it has not always been possible to use the unused one of a pair. In accordance with a second feature of the present invention, it is possible to split any of the eighteen pairs of codes. This is accomplished by the provision of the TR1, TR2, TR3, TR4 and TR5 transfer relays, 301 to 305 inclusive. These relays are operable in response to the operation of the FP relay 300, when the brush 143 of the A code digit register is set upon an odd numbered code point of arc A2.

As an example, it will be assumed that it is desired to split the code pair 83—93 above-referred to. When an office code is dialed of which the A and B code letters have the numerical values of 8 and 3, the brush 141 of the A code digit register will be set upon the No. 8 contact of arc A3 and the brush 164 of the B code digit register will be set upon the No. 3 contact of arc B5. When ground is connected to brush 141 following the operation of the ST relay 111 as previously described, a circuit is established over brush 141 and the No. 8 contact of its arc, over brush 164 and the No. 3 contact of its arc, conductor 168, terminal No. 5 of the terminal strip TC, the lower back contact of transfer relay 302, the No. 5 terminal of the terminal strip TA and conductor 307, which may for example be connected to the No. 4 contacts of the hunting arcs of the translator switches 200 and 220.

When thereafter the translator switches are caused to hunt for the grounded contacts, their brushes will be brought to rest upon the No. 4 contacts of their respective arcs in the manner previously described and selection controls will be effective over such No. 4 contacts for establishing a connection to the office, the office code of which the calling subscriber has dialed.

Should the calling subscriber dial an office code of which the A and B code letters have numerical values 9 and 3, that is, the other one of a pair of codes, then the brush 141 of the A code digit register will be set upon the No. 9 contact of arc A3 and the brush 164 of the B code digit register will be set upon the No. 3 contact of arc B5. Also brush 143 of the A code digit register will be set on contact No. 9 of arc A2 and will establish the previously traced circuit for transfer relay 251 and relay 300. Relay 300 upon operating establishes over its upper contacts obvious operating circuits for transfer relays 301 and 302 and relay 301 upon operating establishes obvious circuits for transfer relays 303, 304 and 305.

When ground is connected to brush 141 following the operation of the ST relay 111 as previously described, a circuit is established over brush 141 and the No. 9 contact of its arc, over brush 164 and the No. 3 contact of its arc, conductor 168, terminal No. 5 of the terminal strip TC, the lower front contact of operated transfer relay 302, the No. 5 terminal of terminal strip TB which may for example be connected over conductor 308 to the No. 34 contacts of the hunting arcs of translator switches 200 and 220.

When thereafter the translator switches are caused to hunt for the grounded contacts, their brushes will be brought to rest upon the No. 34 contacts of their respective arcs in the manner previously described and selection controls will then be effected over such No. 34 contacts for establishing a circuit to the office, the office code of which the calling subscriber has dialed. It will thus be noted that both pairs of the paired codes have been utilized.

It will now be assumed that of the pair of codes 56 and 46, one of the pair 46 is assigned to a code group CGA and that it is desirable to use the other of the pair 56. In this case, for example, the No. 1 terminal of terminal strip TC is connected to the No. 6 contact of arc B3 over conductor 169, and the No. 1 terminal of terminal strip TA is connected over the lead 171 to code group cross-connection terminal CGA, and the No. 1 terminal of the terminal strip TB is connected over conductor 309 with available code points in the left halves of the hunting arcs HB1 and HB2 of the translator switches 200 and 220, as for example code point 38.

If the code 46 is dialed, in which case the A code digit register is set to register the digit 4 and the B code digit register is set to register the digit 6, then when ground is connected to brush 141 of the A code digit register, a circuit is established over brush 141 and the No. 4 contact of its arc A3, over brush 161 and the No. 6 contact of its arc B3, connected to the No. 1 terminal of terminal strip TC over conductor 169; thence over the upper back contact of transfer relay 301, the No. 1 terminal of terminal strip TA, conductor 171 to cross-connection terminal CGA and thence through the winding of code group relay 230. Thereupon code group relays 230, 231 and 232 operate to control the selection of a translator code point and to control selections in the manner previously described.

With the A code digit register set to register the digit 5 and the code B digit register set to register the digit 5, ground connected to brush 143 will establish the circuit of relays 251 and 300 as previously described, resulting in the operation of transfer relays 301 to 305 inclusive. When ground is connected to brush 141 of the A code digit register, a circuit is established over brush 141 and the No. 5 contact of its arc A3, brush 161 and the No. 6 contact of its arc B3 connected to terminal 1 of terminal strip TC over conductor 169, the upper front contact of transfer relay 301, conductor 309 and to the No. 38 contacts of the hunting arcs with which brushes 206 and 226 are associated. The translator brushes will therefore be set upon the No. 38 terminals of their arcs for controlling the establishment of a connection to the office, the office code of which is represented by the digits 56.

It will also be assumed that of the pair of codes 78 and 68, one of the pairs 78 is assigned to a code group CGB as previously described and that it is desirable to use the other of the pair 68. In this case, for example, the No. 18 terminal of terminal strip TC is connected to contact 8 of the B4 arc of the B code digit register over conductor 170, and the No. 18 terminal of the terminal strip TA is connected over conductor 310 with available code points on the right halves of the hunting arcs HB1 and HB2 of the translator switches 200 and 220, as for example to code point 2.

With the A code digit register set to register the digit 6 and the B code digit register set to register the digit 8 and transfer relays 251, 301, 302, 303, 304 and 305 unoperated, when ground is connected to brush 141 of the A code digit register a circuit is established over brush 141 and the No. 6 contact of its arc A3, over brush 163 and the No. 8 contact of its arc B4 connected over conductor 170 to the No. 18 terminal of terminal strip TC, the inner lower back contact of relay 305, the No. 18 terminal of terminal strip TA, conductor 310 and to the No. 2 contacts of the hunting arcs with which brushes 203 and 223 of the translator switches are associated. The translator switches will therefore be set upon the No. 2 contacts of their arcs for controlling the establishment of the connection to the office, the office code of which is represented by the digits 68.

It is thus possible by the connection of the terminals of terminal strip TC directly to contacts of arcs B2, B3, B4 and B5 of the B code digit register 160 and by connecting similarly numbered terminals of the terminal strips TA and TB to contacts in the right and left halves of the hunting arcs of the translator switches to split any desired one or ones of the paired codes which are not assigned to any code groups or, by the connection of terminals on the TA, TB terminal strips to code group terminals CGA and CGB, to split any desired one or ones of paired codes, one code of each such pair having been assigned to one or the other of the code groups. Thus by the grouping of codes and the splitting of paired codes, it is possible to considerably increase the number of offices which may be served without adding additional translator switches.

What is claimed is:

1. In a telephone system, means for controlling the establishment of connections over a plurality of routes each including a plurality of selection stages, comprising primary registering devices operable under the control of a calling subscriber, a secondary registering device operable into a plurality of route-determining positions, route grouping means, means operable under the joint control of said primary registering devices for operating said route grouping means to group routes which require identical controls for certain selection stages thereof, means for operating said secondary registering device under the control of said route grouping means, and means controlled jointly by said grouping means and by said primary registering devices for selectively determining the controls for the other selection stages of said groups of routes.

2. In a telephone system, means for controlling the establishment of connections over a plurality of routes each including a plurality of selection stages, comprising primary registering devices operable under the control of a calling subscriber, a secondary registering device operable into a plurality of route-determining positions, a plurality of route grouping means, means operable under the joint control of said primary registering devices for operating each of said route grouping means to group routes which require identical controls for certain selection stages thereof, means for operating said secondary registering device under the control of said route grouping means, and means controlled jointly by said grouping means and by said primary registering devices for selectively determining the controls for the other selection stages of said groups of routes.

3. In a telephone system, means for controlling the establishment of connections over a plurality of routes each including a plurality of selection stages, comprising primary registering devices operable under the control of a calling subscriber, a secondary registering device operable into a plurality of route-determining positions, means operable under the joint control of said primary registering devices for setting said secondary registering device to determine the controls for all selection stages of certain routes, a plurality of route grouping means each operable under the joint control of said primary registering devices for grouping routes which require identical controls for certain selection stages thereof, means controlled by said grouping means for controlling the setting of said secondary registering device, and means controlled jointly by said grouping means and by said primary registering devices for selectively determining the controls for the other selection stages of said groups of routes.

4. In a telephone system, means for controlling the establishment of connections over a plurality of routes each including a plurality of selection stages, comprising primary registering devices operable under the control of a calling subscriber, a secondary registering device operable into a plurality of route-determining positions, a plurality of sets of route grouping relays each set operable under the joint control of said primary registering devices for grouping routes which require identical controls for certain selection stages thereof, means controlled by said sets of relays for controlling the setting of said secondary registering device into different routing positions, means controlled in the different routing positions of said secondary registering device for determining the controls for said certain selection stages of said groups of routes, and means controlled jointly by said sets of relays and by said primary registering devices for selectively determining the controls for the other selection stages of said groups of routes.

5. In a telephone system, means for controlling the establishment of connections over a plurality of routes each including a plurality of selection stages, comprising primary registering devices operable under the control of a calling subscriber, a translator switch assembly having its switch arcs divided into two halves and operable into a plurality of route-determining positions, means operable under the joint control of said primary registering devices for grouping routes which require identical controls for certain selection stages thereof, means controlled by said grouping means and by one of said primary registering devices for selectively controlling the setting of said translator switch assembly into a route-determining position in one or the other of its halves dependent upon the setting of said one primary registering device, means controlled in the different routing positions of said translator switch assembly for determining the controls for said certain selection stages of said group of routes, and means controlled jointly by said grouping means and by said primary registering devices for selectively determining the controls for the other selection stages of said groups of routes.

6. In a telephone system, means for controlling the establishment of connections over a plurality of routes each including a plurality of selection stages, comprising primary registering devices operable under the control of a calling subscriber to register the office codes of wanted line numbers, said devices being arranged to group said codes in pairs, a translator switch assembly having its switch arcs divided into two halves and operable into a plurality of route-determining positions, means operable under the joint control of said primary registering devices for grouping routes which require identical controls for certain selection stages thereof, means controlled by said grouping means and by one of said primary registering devices for selectively controlling the setting of said translator switch assembly into a route-determining position in one or the other of its halves dependent upon which one of a pair of codes has been registered, means controlled in the different routing positions of said translator switch assembly for determining the controls for said certain selection stages of said groups of routes, and means controlled jointly by said grouping means and by said primary registering devices for selectively determining the controls for the other selection stages of said groups of routes.

7. In a telephone system, means for controlling the establishment of connections over a plurality of routes, comprising primary registering devices operable under the control of a calling subscriber, a secondary registering device operable into a plurality of route-determining positions, relay means operable in response to the setting of the first of said primary registering devices when the first digit dialed is odd, and means jointly controlled by said relay means and said primary registering devices for controlling the setting of said secondary registering device into positions determined jointly by the numerical values of the settings of the primary registering devices and by the odd or even numerical value of the setting of the first of said primary registering devices.

8. In a telephone system, means for controlling the establishment of connections over a plurality of routes, comprising primary registering devices operable under the control of a calling subscriber to register the office codes of wanted line numbers, said devices being arranged to group said codes in pairs, a secondary registering device operable into a plurality of route-determining positions, relay means operable in response to the setting of the first of said primary registering devices when the first digit of a registered code pair is odd, and means jointly controlled by said relay means and by said primary registering devices for controlling the setting of said secondary registering device into different routing positions for each code of any pair of registered codes.

9. In a telephone system, means for controlling the establishment of connections over a plurality of routes, comprising primary registering devices operable under the control of a calling subscriber to register the office codes of wanted line numbers, said devices being arranged to group said codes in pairs, a translator switch assembly having its switch arcs divided into two halves and operable into a plurality of route-determining positions, relay means operable in response to the setting of the first of said primary registering devices when the first digit of a registered code pair is odd, and means jointly controlled by said relay means and by said primary registering devices for controlling the setting of said translator switch assembly into a route-determining position in one or the other of its halves dependent upon which one of any pair of codes has been registered by said primary registering devices.

10. In a telephone system, means for controlling the establishment of connections over a plurality of routes each including a plurality of selection stages, comprising primary registering devices operable under the control of a calling subscriber to register the office codes of wanted line numbers, said devices being arranged to group said codes in pairs, a translator switch assembly having its switch arcs divided into two halves and operable into a plurality of route-determining positions, means operable under the joint control of said primary registering devices for grouping routes which require identical controls for certain selection stages thereof, relay means operable in response to the setting of said primary registering devices when the first digit of a registered code pair is odd, means jointly controlled by said grouping means and by said relay means for controlling the setting of said translator switch assembly into a route-determining position in one or the other of its halves dependent upon which one of a pair of codes is registered and assigned to a group of routes, means controlled in said grouped route position of said translator switch assembly for determining the controls for said certain selection stages, means controlled in said grouped route position jointly by said routing means and by said primary registering devices for selectively determining the controls for the other selection stages of said group of routes, and means jointly controlled by said relay means and by said primary registering devices if the other of a pair of codes has been registered but not assigned to the group of routes for controlling the setting of said translator switch assembly into a route-determining position in the half to which the group of routes has not been assigned.

11. In a telephone system, means for controlling the establishment of connections over a plurality of routes each including a plurality of selection stages, comprising primary registering devices operable under the control of a calling subscriber to register the office codes of wanted line numbers, said devices being arranged to group said codes in pairs, a translator switch assembly having its switch arcs divided into two halves and operable into a plurality of route-determining positions, means operable under the joint control of said primary registering devices for grouping routes which require identical controls for certain selection stages thereof, relay means operable in response to the setting of said primary registering devices when the first digit of a registered code pair is odd, means jointly controlled by said grouping means and by said relay means for controlling the setting of said translator switch assembly into a route-determining position in one or the other of its halves dependent upon which one of the pair of codes has been registered, means controlled in certain of the routing positions of said translator switch assembly for determining the controls for said certain selection stages, means controlled in said certain routing positions jointly by said primary registering devices and by said routing means for selectively determining the controls for the other selection stages of said groups of routes, and means jointly controlled by said relay means and by said primary registering devices for controlling the setting of said translator switch assembly into a route-determining position in one or the other of its halves dependent upon the second codes of pairs, the first codes of which pairs have been grouped.

12. In a telephone system, a translating device for obtaining switching directions from the dialed digits or office codes, comprising a primary registering device operable for registering plural digit office codes, terminals which may be marked with potentials into a plurality of conditions representative of switching directions, code grouping means operable under the control of said primary registering device for grouping codes, each group including codes differing from each other by one of said digits, and means controlled jointly by said grouping means and by the registration of said one digit by said primary registering device for connecting potential to said terminals to condition them to derive a switching directive translation from the particular office code registered in said primary registering device.

13. In a telephone system, a translating device for obtaining switching directions from the dialed digits of a subscriber's line designation, comprising a primary registering device operable for registering sets of untranslated digit information, a secondary registering device for registering translated information, grouping means responsive to the setting of said primary registering device for grouping sets of untranslated information, each group including a plurality of sets of untranslated information and the sets of each group differing from each other by an item thereof, means controlled by said grouping means for conditioning a portion of said secondary registering device in the same manner for all sets of a given group of untranslated information, and means controlled jointly by said grouping means and by said primary registering device for conditioning another portion of said secondary registering device in a manner peculiar to the particular set of untranslated information registered in said primary registering device.

DANIEL KING DU BOIS.

REFERENCES CITED

The following references are of record in the file of this patent:

UNITED STATES PATENTS

| Number | Name | Date |
|---|---|---|
| 1,482,618 | Polinkowsky | Feb. 5, 1924 |
| 1,595,072 | Caverly | Aug. 10, 1926 |
| 1,724,174 | Ballamy | Aug. 13, 1929 |